Figure 1:
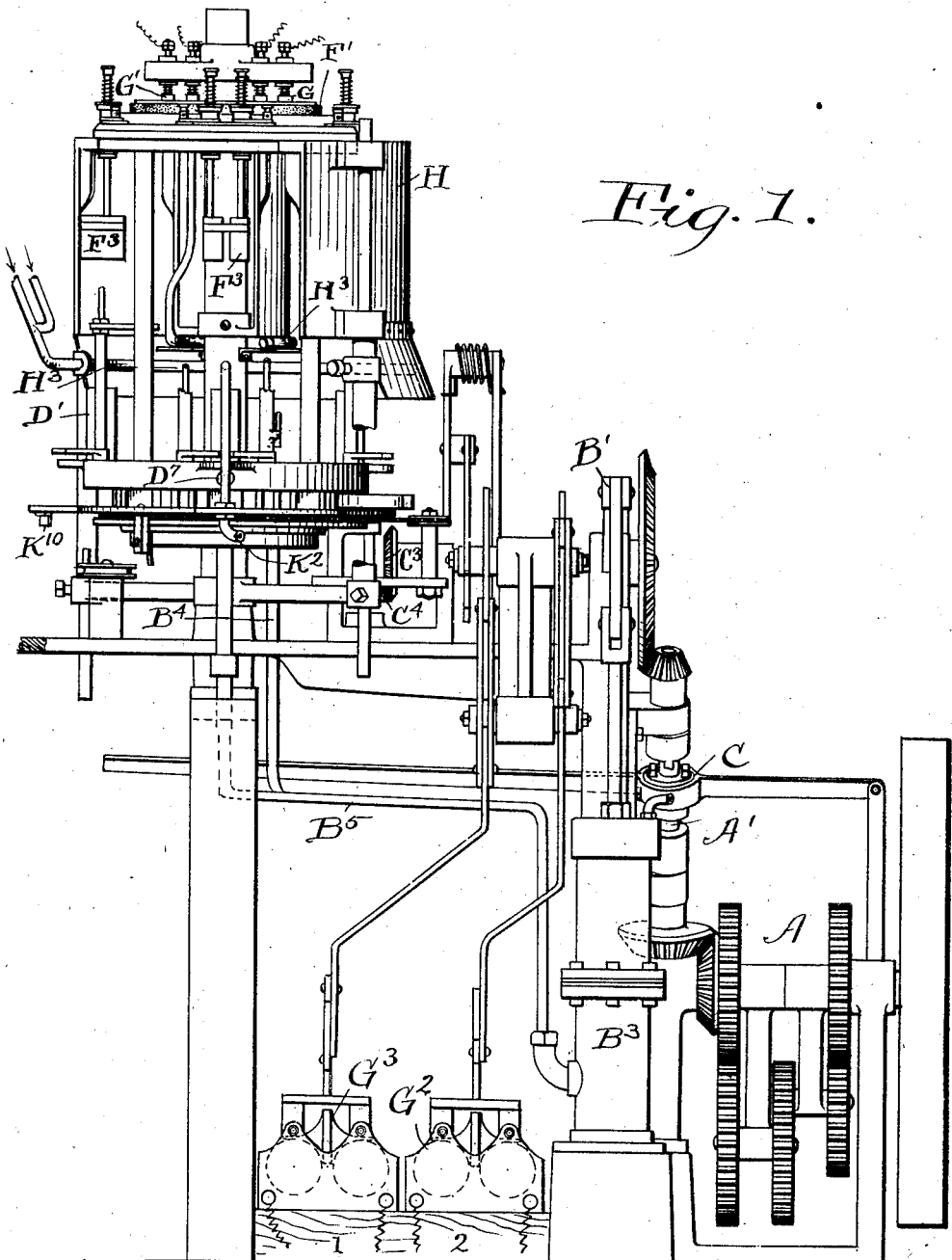

J. R. MASSEY.
APPARATUS FOR EVACUATING INCANDESCENT LAMP BULBS.
APPLICATION FILED DEC. 20, 1905. RENEWED DEC. 3, 1910.

996,936.

Patented July 4, 1911.

10 SHEETS—SHEET 1.

Witnesses.
E. B. Gilchrist
H. R. Sullivan

Inventor
John R. Massey
by Thurston Bates & Woodward
his attorneys

J. R. MASSEY.
APPARATUS FOR EVACUATING INCANDESCENT LAMP BULBS.
APPLICATION FILED DEC. 20, 1905. RENEWED DEC. 3, 1910.

996,936.

Patented July 4, 1911.

10 SHEETS—SHEET 4.

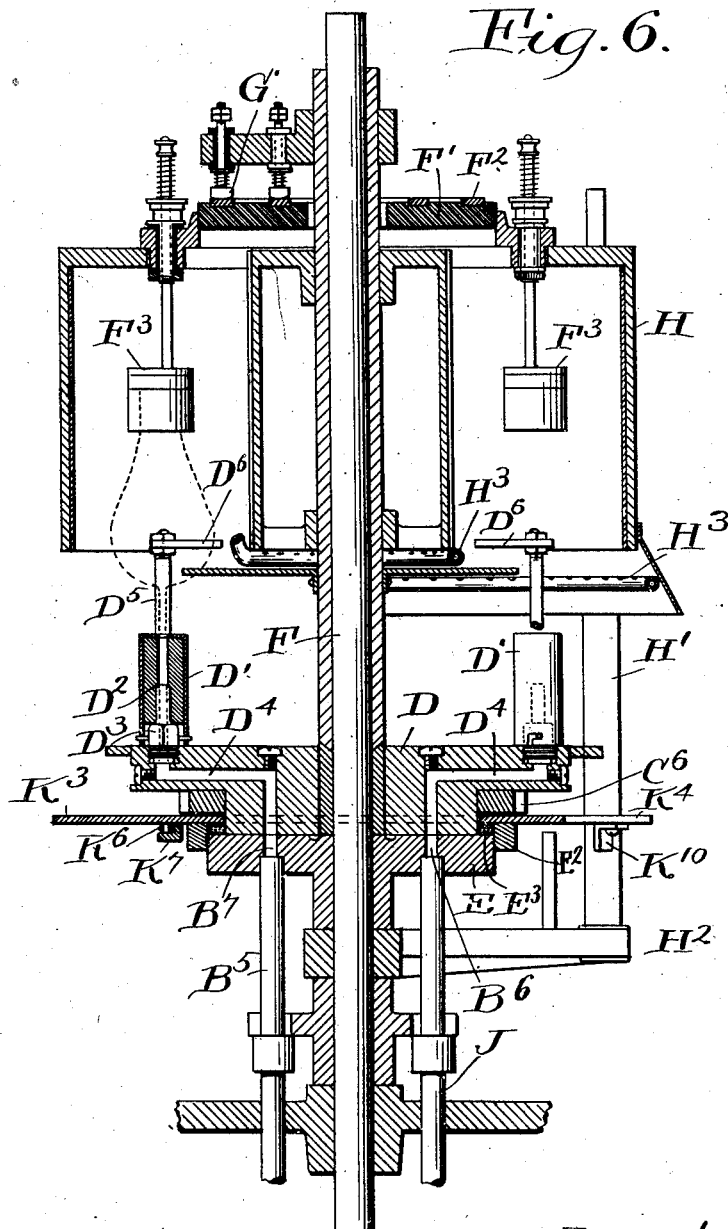

J. R. MASSEY.
APPARATUS FOR EVACUATING INCANDESCENT LAMP BULBS.
APPLICATION FILED DEC. 20, 1905. RENEWED DEC. 3, 1910.
996,936.
Patented July 4, 1911.
10 SHEETS—SHEET 6.
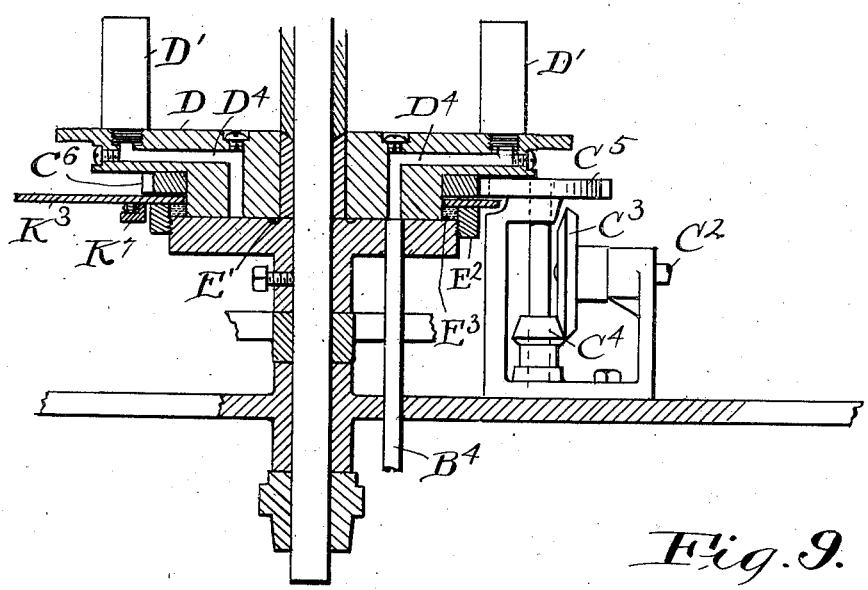
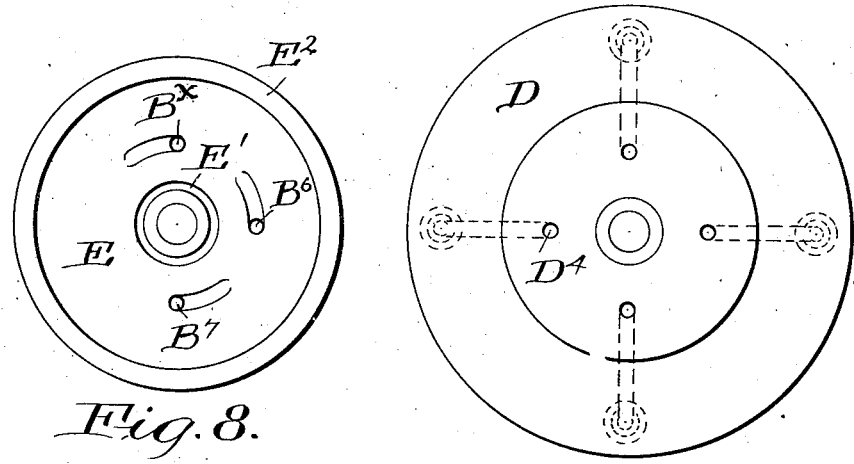

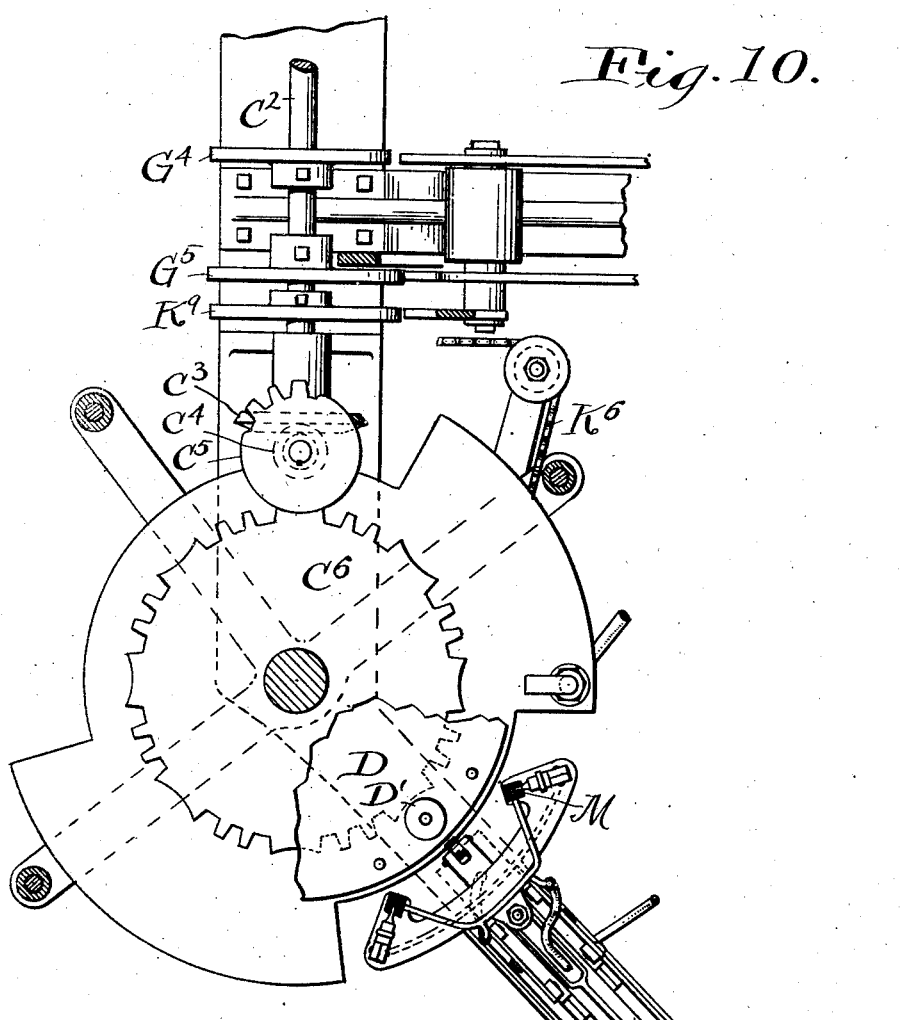

J. R. MASSEY.
APPARATUS FOR EVACUATING INCANDESCENT LAMP BULBS.
APPLICATION FILED DEC. 20, 1905. RENEWED DEC. 3, 1910.

996,936.

Patented July 4, 1911.
10 SHEETS—SHEET 9.

UNITED STATES PATENT OFFICE.

JOHN R. MASSEY, OF CLEVELAND, OHIO, ASSIGNOR TO THE NATIONAL ELECTRIC LAMP COMPANY, OF CLEVELAND, OHIO, A CORPORATION OF NEW JERSEY.

APPARATUS FOR EVACUATING INCANDESCENT-LAMP BULBS.

996,936. Specification of Letters Patent. Patented July 4, 1911.

Application filed December 20, 1905, Serial No. 292,551. Renewed December 3, 1910. Serial No. 595,488.

*To all whom it may concern:*

Be it known that I, JOHN R. MASSEY, a citizen of the United States, residing at Cleveland, in the county of Cuyahoga and State of Ohio, have invented a certain new and useful Improvement in Apparatus for Evacuating Incandescent-Lamp Bulbs, of which the following is a full, clear, and exact description, reference being had to the accompanying drawings.

The object of the present invention is to provide apparatus for automatically and completely effecting the evacuation of incandescent lamp bulbs, and to perform this operation in such manner that the results shall be constant and reliable. The purpose of such construction is to eliminate the various uncertain factors which heretofore have entered into the operation of evacuating lamp bulbs, such as the personal equation, introduced by the operator, resulting in uneven application of heat and current, and variation in the time intervals between the successive steps. It is further desired to avoid the use of the hand operated pinch cocks hitherto used on the vacuum pipes and to escape the danger of foreign gases being allowed to enter the bulb through accidental heating of the rubber of these pipes. The elimination of these pinch cocks and the substitution of metal valves, allows the distance between the valve and the exhaust tube of the bulb to be greatly shortened, thereby diminishing the chance of air and moisture and other gases to be drawn back into the bulb after exhaustion. Also, by the use of mechanism for performing the various operations, it is possible to use separate heating flames of different character for the painting and the tipping operations,—a thing not practicable in former practice where the flame must be manipulated by hand.

One of the principal advantages sought and obtained by this mechanism, is the simultaneous heating and exhausting of the bulb which results in a far more complete evacuation than that obtained where the bulb is first heated and then transferred to the exhausting mechanism. These and many other objects will appear from the detailed description to follow.

Figure 2:
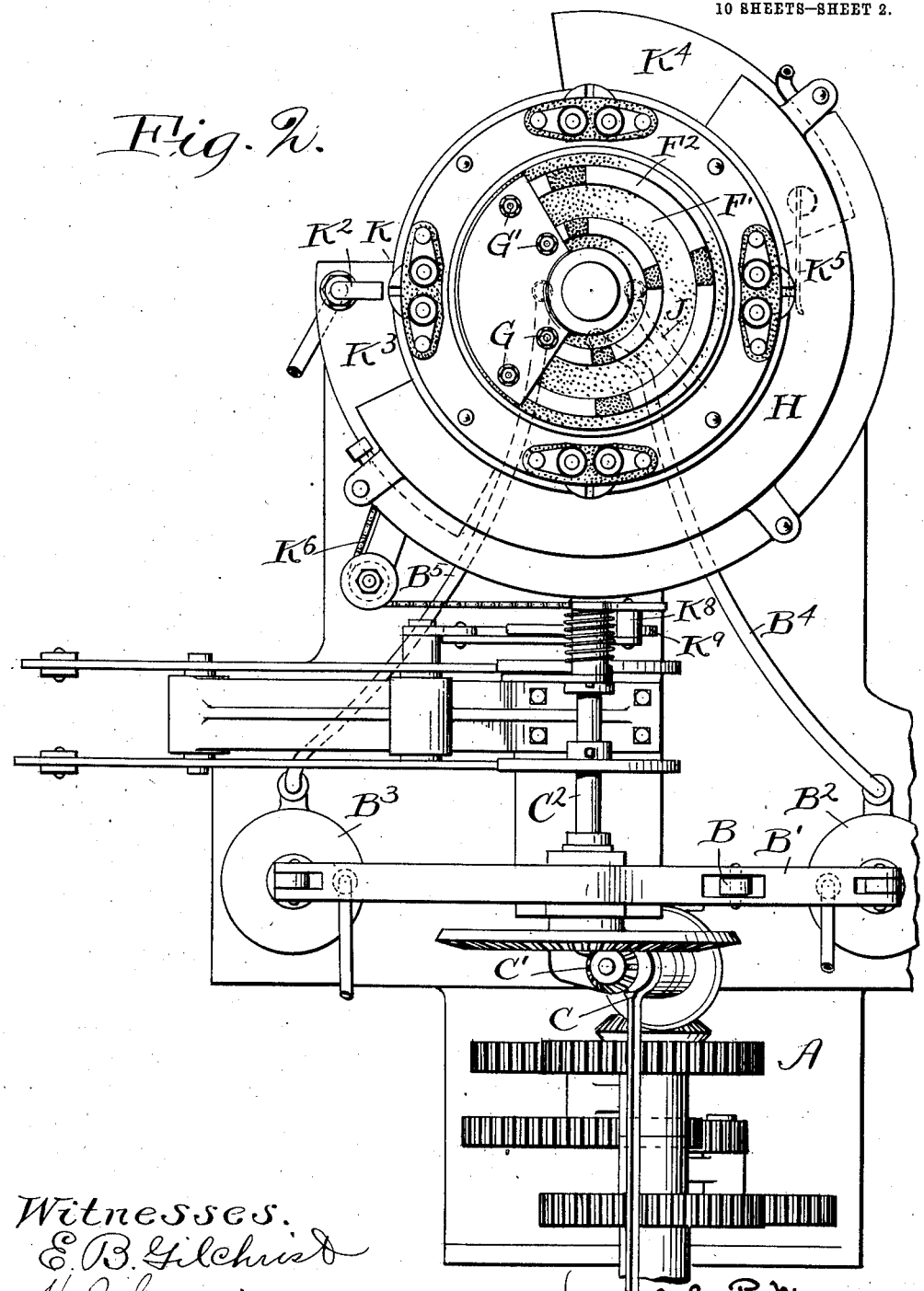
Figure 3:
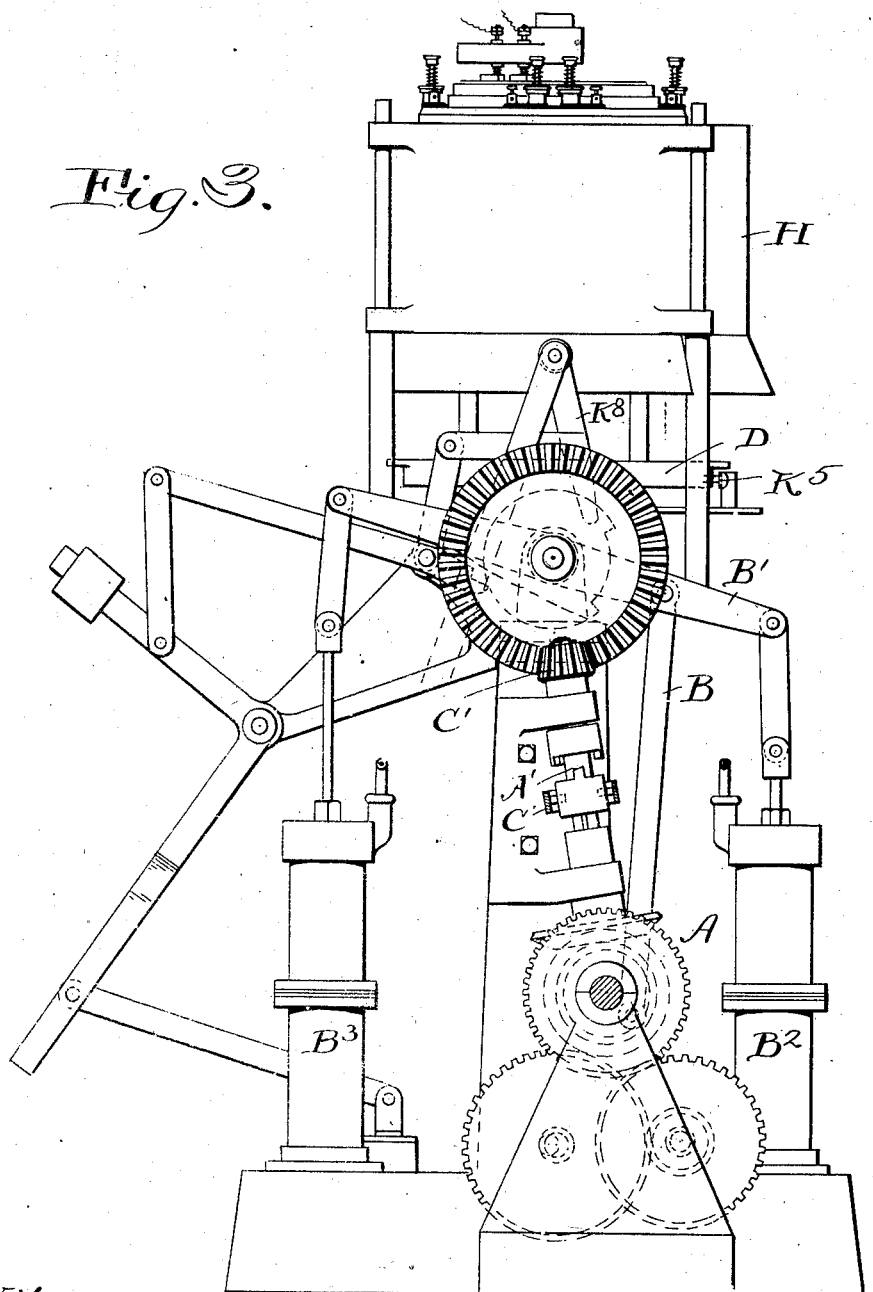
Figure 4:
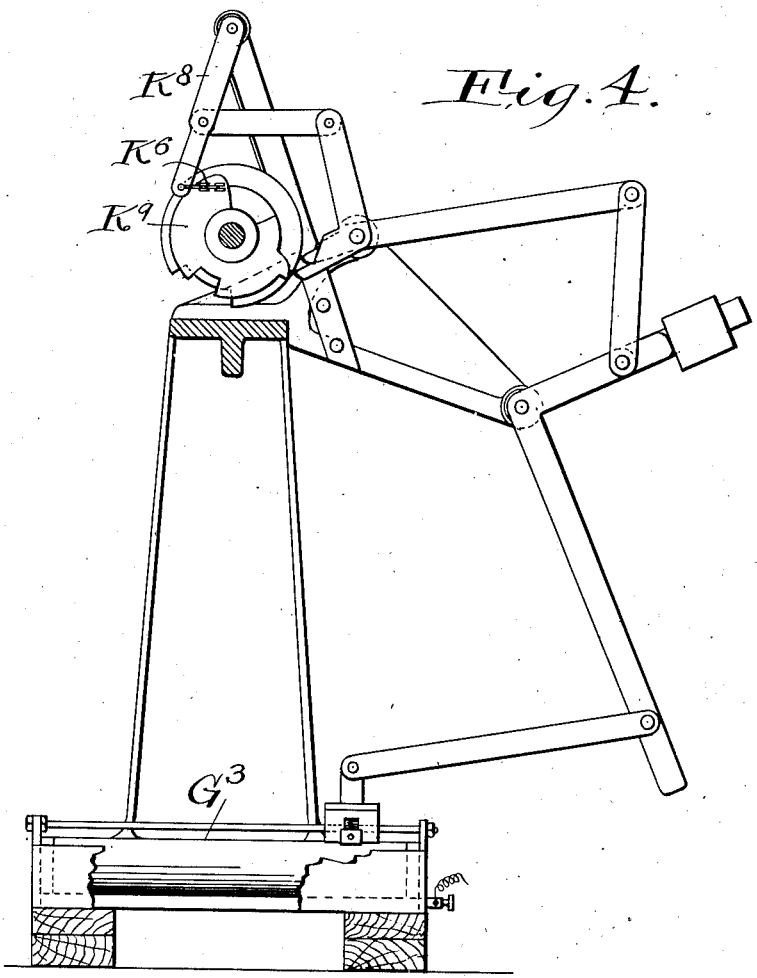
Figure 5:
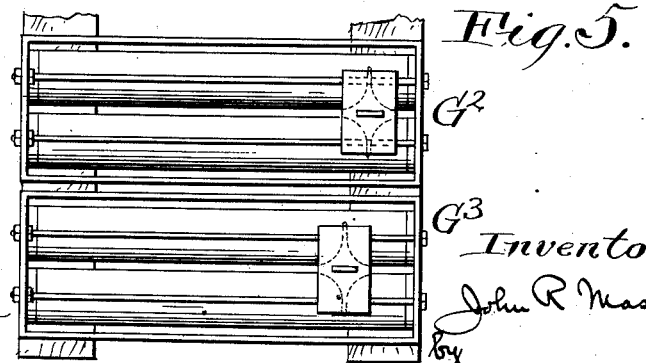
Figure 11:
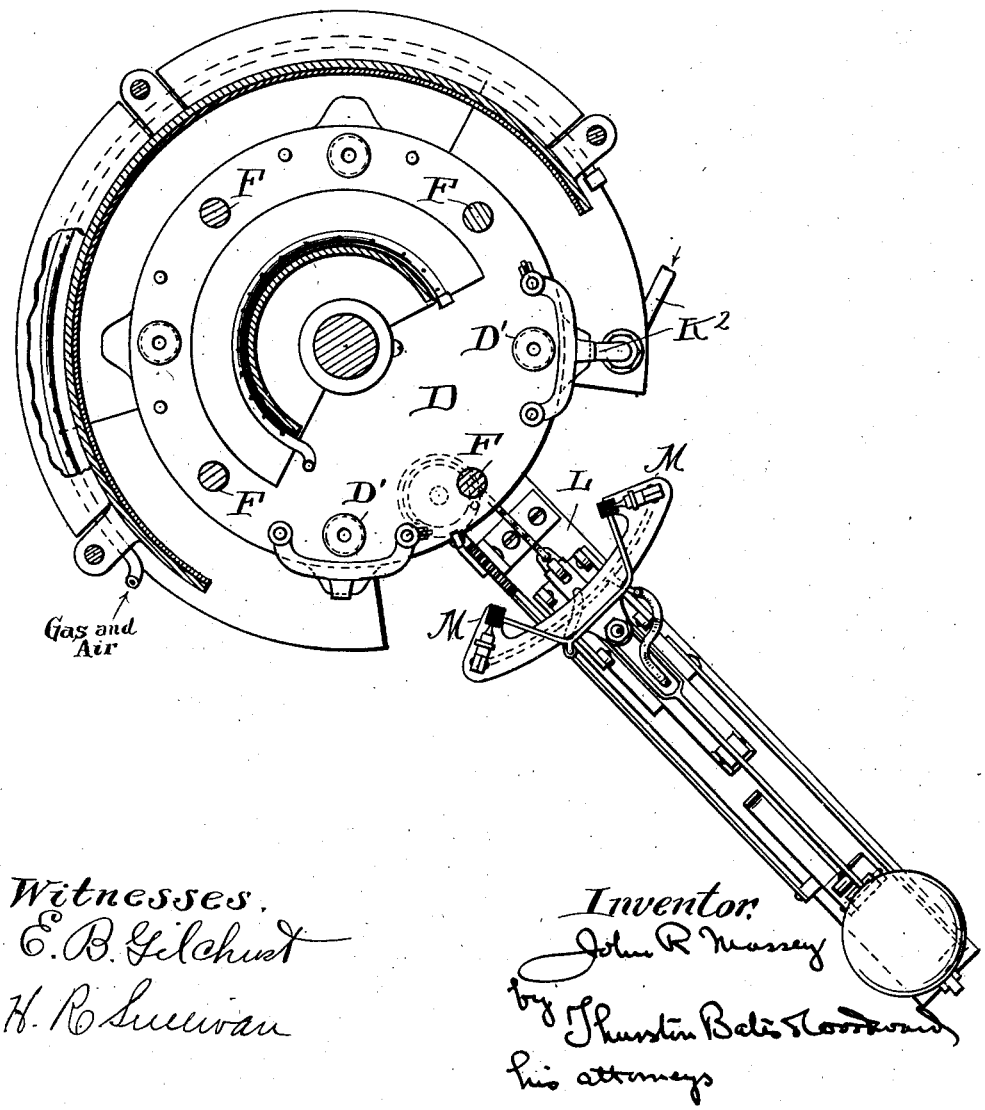
Figure 15:
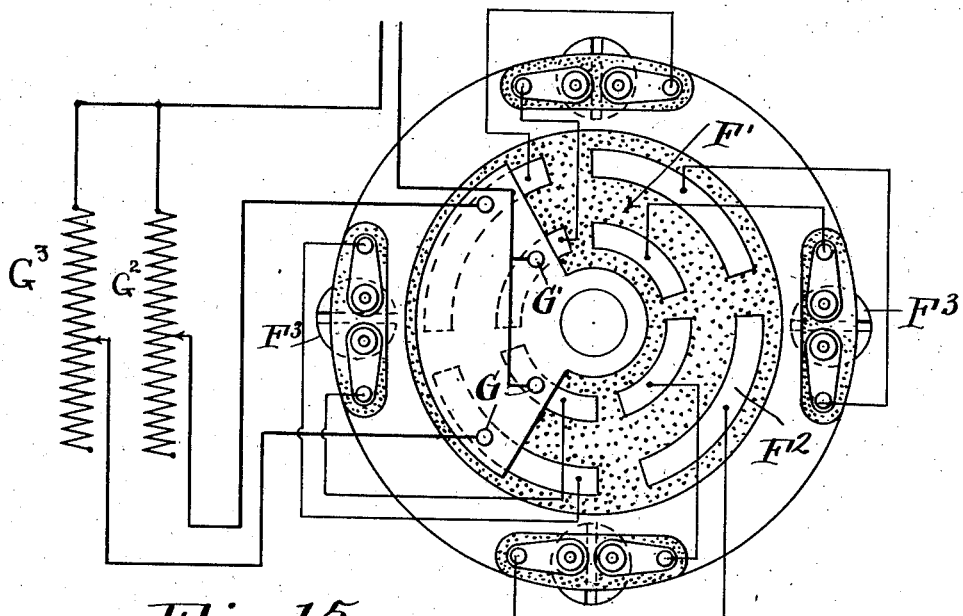
Figure 16:
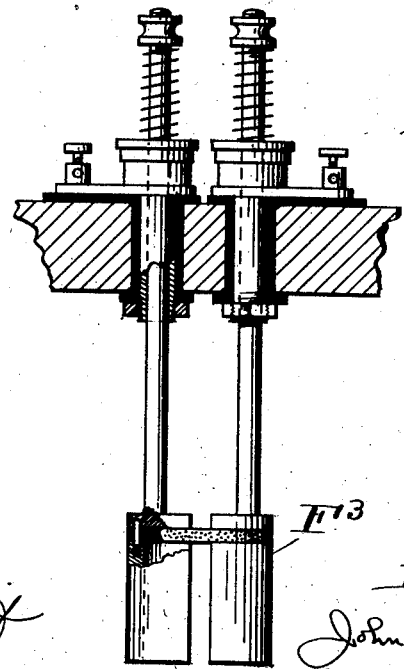

Referring to the drawings, Figure 1 presents a side elevation of the apparatus. Fig. 2 is a plan view of the same. Fig. 3 is a rear elevation. Fig. 4 is a cross sectional elevation, broken away in parts, illustrating the cam connections for operating the rheostats and shifting the paint flame. Fig. 5 is a plan of the rheostats. Fig. 6 is a vertical transverse section viewed from the rear of the machine, illustrating the structure of the valve and the heating hood. Fig. 7 is a vertical longitudinal section of the valve showing the gear connections with the main operating shaft. Fig. 8 is a plan view of the valve seat. Fig. 9 is a bottom view of the valve. Fig. 10 is a plan, broken away in part, illustrating the intermittent gear for rotating the valve and showing the automatic tipping mechanism in position. Fig. 11 is a horizontal cross section taken about midway of the heating hood. Fig. 12 is a side elevation of the automatic tipping mechanism showing parts in section. Fig. 13 is a side elevation of the automatic tipping mechanism before being thrown into operation. Fig. 14 is a detail of the device designed to retain the bulb supports in an elevated position after the automatic tipper has been withdrawn from operation. Fig. 15 is a diagram showing the electrical connection of the receiving sockets or contact clips for the lamp basis. Fig. 16 is an enlarged detail partly broken away showing the construction of the contact clips.

In the form shown, the machine is driven from any suitable source of power through the medium of changeable gear mechanism A, the type of which is immaterial to the operation and which is not therefore described. An inclined shaft $A^1$ is kept under constant rotation through suitable connection with the driving gears. Also connected with the driving gears is a rod B, adapted to constantly oscillate a walking beam $B^1$ which is connected at either end to the pistons of a pair of vacuum pumps $B^2$ $B^3$. These pumps are kept in constant operation so as to maintain the highest possible degree of vacuum in their cylinders which are connected by pipes $B^4$ $B^5$ with the second and third exhaust ports $B^6$ $B^7$ of the valve seat shown in Fig. 8. As shown in the drawings, broken pipes extend from the upper ends of the pump jackets, and while these are immaterial to the invention, it may be mentioned that they lead to the "backing pumps" which serve to assist the first mentioned vacuum pumps in maintaining a high efficiency.

A clutch C is splined to the inclined, constantly rotating shaft above mentioned, and is adapted to be thrown into engagement with a sleeve bearing a bevel gear $C^1$ at the upper end of the shaft. When the clutch is so engaged, motion is transmitted through said bevel gear to a horizontal main shaft $C^2$ which operates the various parts of the apparatus. This main shaft is kept in constant rotation so long as the machine is in use.

At the forward end of the main operating shaft is a bevel gear $C^3$ meshing with a smaller bevel gear $C^4$, (see Figs. 7 and 10) rigidly mounted on a short vertical shaft which bears at its upper end a mutilated gear $C^5$ adapted to mesh with and drive an intermittent gear $C^6$ surrounding, and rigidly attached to, a valve D, carrying the lamps under treatment. The mutilation of the gear $C^6$, just mentioned, is designed to cause the valve to stop at such points in its rotation as may be necessary for the various operations to be automatically performed. As shown, the valve which carries the lamps under treatment will pause, for an interval, eight times during a complete rotation.

The valve seat E over which the valve is mounted, and on which it is supported, is made so as to produce an air-tight surface contact between it and the valve disk. The valve seat E does not rotate but is rigidly secured to a central supporting shaft F mounted on the frame of the apparatus. In a circle about half way between the center and periphery of the valve seat, are the three exhaust ports or perforations $B^x$, $B^6$, $B^7$, on the radii separating the first quadrant from the second, the second from the third, and the third from the fourth. A short, arc-shaped groove or channel 45° in length, extends from each of these perforations.

The valve is provided on its upper side with four vacuum heads $D^1$ for receiving the exhaust tubes extending from the bulbs. These heads are provided with interior rubber sleeves $D^2$ and are fitted over nipples $D^3$ projecting from the upper face of the valve (see Fig. 6). Extending through the valve, from the base of the nipples, are ducts $D^4$ leading out of the lower face of the valve at a point which shall cause them to successively pass over the arc-shaped grooves and perforations $B^x$, $B^6$, $B^7$, of the valve seat below. The intermittent gear $C^6$, above referred to, is arranged to cause the valve to stop at the end of each 45° rotation so that each valve duct $D^4$ shall, after starting from the solid blank space at the front of the valve seat, stop successively over the end of each arc-shaped groove and then over the perforation from which such channel runs.

Referring to Figs. 6, 7, 8 and 9, it will be seen that the valve seat is provided with an oil channel $E^1$ about its center and with a ring $E^2$ about its periphery, which latter extends above the valve to form a second oil channel $E^3$ around the lower end of the valve disk. These oil containing channels assist somewhat in maintaining the sliding contact joint between the valve and its seat air-tight, and to arrest particles of dust and lint so as to prevent them from reaching the surface of the sliding parts.

Fixed to the rotating valve and adjacent to the vacuum heads $D^1$ are standards on which are mounted vertically reciprocative supporting sleeves $D^5$ carrying at their upper ends semi-circular supports $D^6$ on which the bulbs rest when their exhaust tubes have been inserted into the vacuum heads. The manner and purpose of reciprocating these supports will be described below.

Above the rotating valve, and supported by standards F mounted on the valve, is a disk $F^1$ carrying commutator rings $F^2$ and contact clips $F^3$ connected therewith. Rigidly fixed to a sleeve on the central shaft, above the commutator rings are two pairs of brushes G $G^1$, to which are led separate currents from rheostats $G^2$ $G^3$, to be subsequently described. The contact clips $F^3$ are so mounted as to slide up and down in their supports, and are so adjusted that they rest upon the neck of the bulb when the latter is properly positioned on its support $D^6$ with its exhaust tube inserted in the vacuum head $D^1$. Reference to Fig. 2 will make it obvious that with the rotation of the valve and the commutator disk, the currents from the two rheostats will be successively thrown through each lamp in turn. The brushes G $G^1$, above described, are so positioned with regard to the commutator rings as to cause the current from one rheostat to pass through the lamps as they approach the fourth stop in their movement, that is to say, as they approach the point at 180° from the front of the machine, at which point their respective exhaust ducts through the valve will in turn register with the second exhaust port $B^6$ in the valve seat. As the lamp then passes to the succeeding stops, the current from the first mentioned rheostat will be cut off, and that from the second rheostat will be picked up and it in turn cut off, after the manner to be described below.

Partially surrounding the rotating parts is a heating hood H rigidly supported by means of a shaft $H^1$ extending upwardly from a bracket $H^2$ fixed to the frame and provided with heating means, such as gas burners H³. The purpose of this heating hood is to supply external heat to the bulbs during the exhausting operation, particularly during the first exhaustion, so that simultaneously with the withdrawal of the air from the bulb, the temperature will be raised to such a point that all the moisture and condensed vapors contained therein, will be thrown into a gaseous condition and sucked out along with the air.

The first port B$^x$, in the valve seat is connected by a pipe J with a vacuum pump, not shown in the drawings, which is of a type designed to maintain a high vacuum, but not so high a vacuum as that maintained at the second and third ports B⁶ B⁷ by the two pumps shown. These latter pumps are of the best obtainable construction, and the vacuum created thereby is what is ordinarily termed in the art a high vacuum. It is while the lamp is on the ordinary or preliminary vacuum pump that the external heating is most essential.

Surrounding the lower end of the rotating valve, and resting on the ring E² secured to the periphery of the valve seat is a disk K adapted to have a limited oscillatory movement. This disk is independent of the valve and the valve seat, in its movement, and is designed to support a burner K² positioned to apply the paint flame to the exhaust tubes at the proper point in their movement. This disk K may be best designated as the paint flame disk, although, as will be seen by referring to Fig. 2, it is not exactly a true disk, but is provided with projecting wings or ledges K³ K⁴, on one of which, K³, is mounted the burner for the paint flame, and on the other of which, K⁴, is mounted a latch K⁵, adapted to snap into depressions D⁷ on the peripheral face of the valve, which depressions should be four in number and serve the purpose of drawing the paint flame along for a short distance with the bulb on which the flame is being played.

To the lower side of the paint flame disk is attached a chain K⁶, moving in a guideway K⁷, and secured at the other end to a lever K⁸, connected so as to be operated by a cam K⁹ on the main shaft C², in a manner to automatically retract said disk at the proper point and withdraw the paint flame from operation. This flame, as is well understood by those skilled in the art, is designed to heat the phosphorous paint on the interior of the exhaust tubes, thereby causing what residual oxygen may be present, to unite with the vaporized phosphorus and be thus eliminated as a destructive element. On the lower side of the paint flame disk may be provided stops K¹⁰ adapted to strike against suitable fixed standards or parts of the frame, not shown, so as to limit its extent of movement and prevent the disk being accidentally thrown beyond the proper limits of its oscillation.

Secured to a spider L projecting from the supporting shaft is the automatic tipping or sealing device, which is properly advanced into and out of operation through the movement of the paint flame disk and the valve. This mechanism is designed to apply a sharp-pointed fusing flame to the exhaust tubes, after the bulbs have been completely evacuated and the paint flame applied and withdrawn. This tipping flame is directed from the burners M against the exhaust tube close to the bulb and quickly fuses it at that point. Simultaneously with such fusion a lifting force is applied to the supporting sleeves D⁵ carrying the support D⁶ for the bulb, thus tending to attenuate and close the exhaust tube, the lower end of which is firmly held by the rubber sleeve in the exhaust hood. The continued attenuation results in the separation of the bulb from the tube and the formation of the tip.

Referring to Figs. 10, 11, 12 and 13, it will be seen that the tipping flame is mounted on a standard M¹ projecting from a sliding block M² having gas and air ducts therethrough. This sliding block is mounted over a fixed block M³ secured to the spider L, which last mentioned block also has gas and air ducts therethrough, with which the ducts of the sliding block M² register at the advanced position of the latter. A shallow groove is provided along the contact face of one of these blocks, so as to permit a constant but decreased flow of gas to pass to the burner, when the sliding block is retracted, thus permitting the flame to be continuously maintained with economy.

To the forward end of the sliding block M² is attached one end of a chain M⁴ which passes around and is secured at its other end to a pulley wheel M⁵, supported on the spider L. This pulley wheel has attached thereto a spring which tends to keep the chain taut, but which is without sufficient strength to cause any movement on the part of the sliding block. Projecting from the upper end of the pulley wheel is a lug M⁶ so positioned as to be in the path of a pivoted pawl K¹¹ depending from the paint flame disk. This pawl K¹¹ is held in operative position by means of a spring and is adapted to snub past the projecting lug M⁶ as the paint flame disk is drawn forward with the valve, but is adapted to come into unyielding, operative engagement with said lug when the paint flame disk is retracted through the medium of its chain, levers, and cam, as will be subsequently described.

Slidingly mounted on the standard M′ which supports the tipping burner is a lifting sleeve M⁷ having at its upper end a projecting arm M¹¹ carrying at its forward end anti-friction rollers designed to pass under toes $D^8$ projecting from the lower ends of the supporting sleeves $D^1$ carrying the arc-shaped supports $D^6$ for the bulbs.

For the purpose of automatically lifting the bulb supports, I have provided a weighted lever $M^8$, one end of which is forked and embraces the tipping flame standard M' bearing against anti-friction rollers at the lower end of the sleeve $M^7$ mounted on this standard. The weight of the opposite end of the lever is sufficient to give the proper upward pressure to the movable parts and to transmit the same to the bulb in such manner that the exhaust tube will be attenuated as soon as it is rendered plastic by the tipping flame. The weighted end of the lever is, when not in operation, supported by a short arm $M^9$ pivoted on the spider.

A connecting rod $M^{10}$ is secured to the aforesaid short arm and, by means of an elongated eye slot, is also connected with the sliding block $M^2$ carrying the tipping standard. This connecting rod is designed to withdraw the short arm supporting the weighted lever, and the long eye slot is provided for the purpose of allowing the block $M^2$ to advance sufficiently far to bring the projecting arm $M^{11}$ of the lifting sleeve under the toe $D^8$ of the bulb supporting sleeves before the supporting arm $M^9$ is tripped from under the weight.

Journaled in a bracket on one side of the spider are two meshing spur gears $M^{12}$, $M^{13}$. Secured to the upper gear $M^{12}$ is a lever $M^{14}$, the upper end of which rests normally against the edge of the rotating valve. Secured to the edge of the valve and adapted to displace this lever are four cam wedges $D^9$, which are so spaced as to throw the lever $M^{14}$ outward as soon as a lamp passes away from the tipping flame. This outward throw results in a rotation of the upper gear $M^{12}$ and a consequent rotation of the lower gear $M^{13}$ in the opposite direction. Projecting from the lower gear is a second arm $M^{15}$ having connected to its lower end a rod $M^{16}$ designed to operate a lifting arm $M^{17}$ lying underneath the weighted lever, above mentioned. This lifting arm is provided with a cam surface $M^{18}$, against which the supporting arm $M^9$, for the weight, falls and rests when withdrawn from its supporting position. The arrangement of these parts is such that the effect of the cams $D^9$, on the edge of the valve, is to simultaneously lift the weighted lever $M^8$ and throw the supporting arm up thereneath. Through the lifting of this supporting arm the sliding block is drawn backward, choking off the burner and removing the projecting arm $M^{11}$ from the path of the vacuum heads and supporting standards.

In Figs. 12 and 13, I have shown side brackets with anti-friction rollers for guiding the upper sliding block and holding it in position.

Fig. 14 illustrates a form of catch $D^{10}$ adapted to maintain the supporting sleeves $D^1$ in any position to which they may be raised by the lifting sleeve $M^7$.

The rheostats $G^2$ $G^3$, which control the flow of current through the lamps, are of any suitable construction in which a sliding contact bridge is used. These bridges are shifted back and forth, through the medium of bell crank levers, by cams $G^4$ $G^5$ mounted on the main shaft. The two cams for controlling the rheostats, as well as the cam for retracting the paint flame disk, are each suitably cut so as to permit the variation in the current and the movement of the paint flame to take place at the proper points in the operation of the apparatus, which operation will now be described.

As will be seen from the structure, it is designed to treat the four lamps simultaneously, though it is apparent that a greater or less number may be treated at the same time by somewhat altering the design of the cams and the number of vacuum heads and ports in the valve. The number treated is not material, as this is a matter of administrative economy in the shops where the machine is to be used.

Referring to Fig. 8, it will be seen that when the bulb is placed upon the vacuum head at the front of the machine, the conduit for that head does not register with any groove or port in the valve, but is at rest over a solid blank space in the front of the valve. (See left hand of Fig. 8). As the intermittent gear advances the valve 45° the exhaust conduit stops over the end of the groove in the face of the valve leading to the preliminary vacuum port $B^x$. The second stop brings the valve conduit into full register with port $B^x$. The degree of vacuum maintained by the "preliminary" vacuum pipe J is high but not so nearly perfect as that maintained by the second and third pipes $B^4$ $B^5$, which latter is of the highest possible order created by the best high vacuum pumps. In the further description of the operation it will be understood that the vacuum maintained at the second and third ports $B^6$ $B^7$ is of the same degree, but these ports will be referred to in their respective order as the first and second high vacuum pumps. While the lamp is in communication with the preliminary vacuum, the external heat is sufficient to vaporize all of the moisture and most other gases which are not condensed in the pores and joints of the carbon filament. This simultaneous vaporization and exhaustion is, as above pointed out, of great value and is a great improvement over the process, as carried out by hand, wherein the heating and vaporization has been done in advance of the exhaustion, and even in advance of the connection being established between the bulb and the vacuum head.

After leaving the preliminary vacuum the intermittent gear brings the bulb to a third stop over the end of the groove communicating with the first high vacuum. During the next movement by the intermittent gear, by which the port in the valve is brought into full register with the first high vacuum port of the valve seat, the commutator segments for the contact clip ride under the first pair of brushes, and the cam controlling the rheostats for this circuit is so adjusted as to cause the filament to burn at a low red heat for a few seconds and then suddenly rise for a brief period to the flash point. This sudden rise in the current is made for the purpose of heating up the joints between the filament and the platinum wires, thereby causing the driving out of any gases contained therein. During the next movement of the lamp, in which it passes off of the first high vacuum, the rheostat controlling the current permits it to drop down somewhat from the flashing point to the normal current with which the lamp is designed to operate, and this current is maintained as the lamp comes to the fifth stop over the second high vacuum groove. Upon the next movement of the tube to the point where it comes immediately over the port for the second high vacuum, the commutator segments leave the first pair of brushes and move under the brushes controlled by the second rheostat. This rheostat is so regulated by its cam as to receive the lamp at the same voltage as that at which it leaves the first circuit. While on this stop and still in communication with the second high vacuum the second rheostat is operated by its cam so as to raise the voltage for a brief period, and immediately thereafter the cam controlling the paint flame disk operates to draw the paint flame back in such position that the flame plays upon the tube at the portion containing the phosphorous paint. At this point the intermittent gear moves the bulb forward toward the seventh stop and, the spring latch attached to the paint flame disk having snapped into a perforation on the peripheral face of the valve, the paint flame is accordingly drawn forward along with the bulb. The voltage through the lamp may meanwhile again drop to the normal point and the valve port passes out of communication with the second high vacuum and over the blank space on the valve face. The heat of the paint flame vaporizes the phosphorous paint, which vapor combines with any residual oxygen and completes the exhaustion of a lamp. This flame is brush shaped and spreads over the exhaust tube with the effect of softening the side of the tube against which it plays for approximately a third of an inch. The softened portion of the tube is forced back by the exterior air pressure against the solid side of the tube opposite and forms a seal which is ordinarily effective until the tipping is accomplished. After the lamp comes to the seventh stop and while still thereat the cam controlling the paint flame disk operates to withdraw the paint flame back toward the sixth stop, but does not draw it the entire distance at once, leaving the remaining distance to be covered by a second movement controlled by a second surface of the cam.

As the paint flame disk is drawn backward, the pivoted pawl K'', depending from the lower side thereof, strikes against the projection on the pulley wheel to which is attached the chain leading to the sliding block carrying the tipping flame. As this pulley wheel is rotated, the tipping flame block is drawn forward, throwing the gas conduits into full alinement and bringing the projecting arm M'' on the lifting sleeve under the toe $D^8$ of the supporting sleeve. The continued movement of the block draws the supporting arm from beneath the weighted lever which tends to throw the lifting sleeve upward,—the lifting pressure being transmitted to the bulb through the medium of the lifting and supporting sleeves, as previously described. The tipping flame being adjusted to play upon a point of the exhaust tube immediately adjacent to the bulb, the tube becomes softened and the lifting pressure draws the bulb upward, attenuating and closing the softened portion of the tube. The lifting of the bulb in this manner draws the softened glass into a slender filament, which either breaks off from the tip of the bulb by its mere attenuation, or is readily broken by the attendant.

While it is unnecessary, so far as an individual bulb is concerned, to cause it to pause at each one of the points enumerated these pauses are made to permit the other bulbs to make the necessary pauses simultaneously at other points in the circle. It is also evident that the number of these stops may be shortened where it is found not desirable to give such an extended time for certain portions of the treatment. It may also be noted that while the automatic tipping mechanism coöperates to produce an economical and rapidly operating apparatus for completing the lamp, it may be dispensed with and the tipping accomplished by hand before the lamp is removed from the exhaust head.

The mechanism herein illustrated and described shows the valve movable and valve seat fixed but it would not be a departure in principle to have the valve fixed and the valve seat movable, it merely requiring the exercise of mechanical skill to produce a number of such modifications. Similarly the mechanism might be modified to allow the bulbs to remain unmoved while the various exhaust and electric connections are made by movement of the mechanism.

It will be noted that the underlying principle of the mechanism which I have invented resides in having the evacuation of the bulbs progress in such wise that there will be established a series of bulbs which shall be contemporaneously in different stages of the evacuation treatment, and this should be true in all modifications or arrangements of the evacuating mechanism. Thus, while it is preferable for operating reasons to have but a single bulb at the same stage of progress toward completion, this is not an essential arrangement, as the apparatus may be expanded to permit a unit consisting of a plurality of bulbs to be treated so that each member of the unit would be simultaneously subjected to the same treatment, there being other bulbs or units meanwhile maintained at different stages of the treatment. This obviously would not be a departure from the broad invention herein claimed which consists of an arrangement in which bulbs are subjected to the evacuating treatment in such manner that a plurality will be at different stages of progress toward completion, thus enabling the operator or operators to handle continuous series of bulbs so long as the operation proceeds. Also it may be noted that while the mechanism disclosed is periodic in its action, this is designed simply for the purpose of affording the operator an abundance of time within which to apply and remove the lamps from the exhaust heads and it is not my intention to limit my claims to this single mechanism as my broader claims are drawn to cover those obvious mechanical modifications in which the progress of evacuation treatment is uninterrupted and the variations in either the degree of exhaust or the value of the electric flow, or both, may be obtained without actually severing the communications therefor.

Having thus described my invention, I claim:

1. Mechanism for evacuating lamp bulbs comprising a plurality of exhaust connections, means for shifting a bulb from a connection to another, and means for applying heat exteriorly to the bulb while in communication with one of said exhaust connections.

2. Mechanism for evacuating lamp bulbs comprising two members one movable relative to the other, one of said members having a plurality of exhaust ports therethrough, the other member having an exhaust head thereon adapted to receive a bulb, a duct leading from said exhaust head to a point such that, upon the movement of one member, communication may be established between the exhaust head and the exhaust ports in the other member.

3. Mechanism for evacuating lamp bulbs comprising a fixed valve seat having a plurality of ports therethrough, a movable valve mounted on said seat and bearing an exhaust head, a duct leading from said exhaust head to a point on the valve such that, upon the movement of the latter, communication will be established between the exhaust head and the ports, and an oil seal inclosing the contacting surfaces of the valve and its seat.

4. Mechanism for evacuating lamp bulbs comprising a valve having exhaust heads adapted to receive the bulbs, a valve seat having therein a plurality of ports, and exhaust connections for said ports, two of said exhaust connections leading to exhausting means adapted to maintain the same degree of vacuum in each connection.

5. Mechanism for evacuating lamp bulbs comprising a plurality of exhaust connections, means for sustaining the bulb and shifting it from communication with one exhaust connection to another, and means operative upon said shifting for passing a current through the filament of the lamp while the bulb is in communication with one of said exhaust connections.

6. Mechanism for evacuating lamp bulbs comprising an exhaust connection, means for establishing communication between a bulb and the exhaust connection, means for conducting a current through the filament of the lamp while the bulb is connected with the exhaust, and means for applying exterior heat locally to a projection from the bulb.

7. Mechanism for evacuating lamp bulbs comprising an exhaust connection, means for establishing and breaking communication between a bulb and the exhaust connection, and means adapted to apply heat locally to a projection of the bulb.

8. Mechanism for evacuating lamp bulbs comprising an exhaust head for receiving the bulb, an exhaust connection, means whereby communication may be established or broken between the exhaust head and the exhaust connection by the movement of the exhaust head, heating means adapted to apply heat locally to a projection of the bulb while the latter is in communication with the exhaust head, and means whereby the said heating means is caused to move with the exhaust head.

9. Mechanism for evacuating lamp bulbs comprising an exhaust connection, means for establishing communication between a bulb and the exhaust connection, means for breaking such communication, means adapted to conduct a current through the filament of the lamp during maintenance of said connection and after the breaking thereof, and means for applying heat locally to a projection of the bulb after the connection is broken.

10. Mechanism for evacuating lamp bulbs comprising an exhaust head adapted to receive the bulb, a plurality of exhaust connections, means adapted to shift the exhaust head so as to successively communicate with the several exhaust connections, means for conducting a current through the filament of the lamp during the shifting of the exhaust head, and means for automatically varying the current at certain points in the path of movement.

11. Mechanism for evacuating lamp bulbs comprising an exhaust head adapted to receive the bulb, a plurality of exhaust connections, means adapted to shift the exhaust head so as to successively communicate with the several exhaust connections, means for conducting a current through the filament of the lamp during the shifting of the exhaust head, means for automatically varying the current at certain points in the path of movement, and means for applying heat locally to a projection from the bulb, said last mentioned means being adapted to move with the exhaust head.

12. Mechanism for evacuating lamp bulbs comprising an exhaust head for receiving the bulb, means for moving the exhaust head, means for applying heat locally to a projection from the bulb, means whereby said heating means may be moved in unison with the exhaust head, and means for stopping the movement of said heating means at a definite point.

13. Mechanism for evacuating lamp bulbs comprising an exhaust head for receiving the bulb, means for moving the exhaust head, means for applying heat locally to a projection from the bulb, means whereby said heating means may be moved in unison with the exhaust head, means for stopping the movement of said heating means at a definite point, and means for automatically thereafter retracting said heating means.

14. Mechanism for evacuating lamp bulbs comprising an exhaust head adapted to receive a lamp bulb, means for advancing the exhaust head, means adapted to apply heat locally to a projection from the bulb, means adapted to bring said heating means adjacent to the bulb at a definite point in the movement of the exhaust head, means adapted to automatically cause the heating means to accompany the exhaust head in its movement from this point, and means for automatically retracting the heating means after it has reached a given point.

15. Mechanism for evacuating lamp bulbs comprising means adapted to receive a bulb, means for shifting the receiving means into and out of communication with an exhaust connection, means for locally applying a heating flame to a projection of the bulb, and means for locally applying a second heating flame between the crest of the bulb and the point of application of the first heating flame.

16. Mechanism for evacuating lamp bulbs comprising means for establishing communication between a bulb and exhausting means, means for breaking such communication, means adapted to apply heat locally to a projection of the bulb, and means for throwing such heating means out of operation and bringing a second heating means into position to apply heat between the bulb and the point of application of the first heating means.

17. Mechanism for evacuating lamp bulbs comprising means for establishing communication between a bulb and exhausting means, means for breaking such communication, means adapted to apply heat locally to a projection of the bulb, means for throwing such heating means out of operation and bringing a second heating means into position to apply heat between the bulb and point of application of the first heating means, and means adapted to exert a tension upon the said projection at the second mentioned point of heating.

18. Mechanism for evacuating lamp bulbs comprising means for establishing communication between a bulb and exhausting means, means for breaking such communication, and means for automatically advancing a tipping flame toward the bulb.

19. Mechanism for evacuating lamp bulbs comprising means for establishing communication between a bulb and exhausting means, means for breaking such communication, means for automatically advancing a tipping flame into position to play upon a projection from the bulb, and means for simultaneously exerting a tension upon the heated portion of the projection.

20. Mechanism for evacuating lamp bulbs comprising means for establishing communication between a bulb and exhausting means, means for breaking such communication, means for automatically advancing a tipping flame into position to play upon a projection from the bulb, means for simultaneously exerting a tension upon the heated portion of the projection, and means adapted to automatically remove the tipping flame from its operative position.

21. Mechanism for evacuating lamp bulbs comprising means for establishing communication between a bulb and exhausting means, means for breaking such communication, means adapted to advance a tipping flame to play upon a projection from the bulb, means adapted to move the bulb so as to attenuate the projection at the point heated by the flame, and means for retaining the bulb in its new position.

22. Mechanism for evacuating lamp bulbs comprising means for establishing communication between a bulb and exhausting connections, means for advancing the bulb to a position to receive a tipping flame, and means adapted to exert a pull upon the bulb while the tipping flame is in operation.

23. Mechanism for evacuating lamp bulbs comprising means for establishing communication between a bulb and exhausting means, means for advancing the bulb to a position to receive a tipping flame, means adapted to automatically exert a pull upon the bulb while the tipping flame is in operation, and means adapted to automatically restore the pulling means to its original position.

24. Mechanism for evacuating lamp bulbs comprising a plurality of exhaust heads adapted to receive the bulbs, a plurality of exhaust connections, means whereby the connection may be successively established between each of the exhaust heads and each of the exhaust connections.

25. Mechanism for evacuating lamp bulbs comprising a plurality of exhaust heads adapted to receive the bulbs, a plurality of contact clips adapted to transmit a current through the filaments of the lamps, commutating means adapted to control the contact clips in such manner so that the same flow will be transmitted through the several filaments in succession.

26. Mechanism for evacuating lamp bulbs comprising a plurality of exhaust heads adapted to receive the bulbs, a plurality of contact clips adapted to transmit a current through the filaments of the lamps, commutating means adapted to control the contact clips in such manner that the same current will be transmitted through each lamp filament in succession, and means for varying the current within predetermined limits.

27. Mechanism for evacuating lamp bulbs comprising a plurality of exhaust heads adapted to receive the bulbs, a plurality of exhaust connections, means adapted to successively establish communication between the bulbs and the exhaust connections, means for conducting a current through the filaments of the bulbs during the establishing of the exhaust communications, and mechanical means for varying the strength of the current.

28. Mechanism for evacuating lamp bulbs comprising a plurality of exhaust heads adapted to receive the lamp bulbs, a plurality of exhaust connections, means adapted to obtain relative movement between the bulbs and the exhaust connections so as to successively establish communication between the bulbs and the several exhaust connections, means for conducting a current through the filaments of the bulbs during the relative movement aforesaid, and means for varying the current at given points of the movement.

29. Mechanism for evacuating lamp bulbs comprising means for supporting a plurality of bulbs and means for periodically and progressively establishing electric and exhaust communications with the several bulbs.

30. Mechanism for evacuating a plurality of lamp bulbs successively comprising exhaust and electric communications, and means for progressively and periodically establishing connection between each bulb and each of said exhaust and electric communications.

31. Mechanism for evacuating lamp bulbs comprising exhaust and electric communications, and mechanical means for progressively establishing connection between a plurality of bulbs and the exhaust and electrical communications.

32. Mechanism for evacuating lamp bulbs comprising means for supporting a plurality of bulbs, exhaust and electric communications therefor, and means for progressively varying the degree of the exhaust and the value of the electric flow in such manner that some of the bulbs shall differ as to their stage of progress toward completion.

33. Mechanism for evacuating lamp bulbs comprising means for supporting a plurality of bulbs, exhaust and electric communications therefor, and means for progressively varying the value of the flow through either of said communications in such manner that some of the bulbs shall differ as to their stage of progress toward completion.

34. Mechanism for evacuating lamp bulbs comprising means for supporting a plurality of bulbs, exhaust and electric communications therefor, and means for progressively varying the value of the electric flow in such manner that some of the bulbs shall differ as to their stage of progress toward completion.

35. In an exhausting machine, a plurality of supports for bulbs, a pump, means for connecting the pump to the bulbs in said supports, a plurality of heaters, and means for moving said heaters simultaneously into and out of position for heating the bulbs in said supports.

36. In an exhausting machine, a rotatable frame, a plurality of supports for bulbs carried thereby, a valve having a movable valve member secured to the frame, a pump connected to the valve, means for rotating the frame and movable valve member to connect the pump with the bulbs in said supports, and a heater for heating the bulbs.

37. In an exhausting machine, a support for a bulb, a pump, means for connecting the pump to a bulb in said support, electrical connections for the filament of the bulb in said support, a rheostat in said electrical connection, a power shaft, and means for causing the power shaft to actuate the movable member of the rheostat.

38. In an exhausting machine, a support for a bulb, a pump, means for connecting the pump to a bulb in said support, electrical connections for the filament of the bulb, a power shaft, and means actuated by the power shaft for varying the potential on said filament.

39. In an exhausting machine, a rotatable frame, a plurality of supports for bulbs carried thereby, a power shaft, means actuated thereby for rotating the frame and the bulb supports, means for closing circuit through the filaments of the bulbs in said supports successively, a resistance, and means actuated by the power shaft for cutting said resistance into and out of circuit with each of said filaments.

40. An exhausting machine comprising a rotatable frame, a plurality of supports for bulbs carried thereby, a valve having a member movable with the frame to which said supports are connected, a pump connected to the valve, a power shaft, means actuated thereby for rotating the frame and movable valve member to connect the pump to the bulbs in said supports, means for closing circuit through the filaments of the bulbs in said supports successively, a resistance and means actuated by the power shaft for cutting said resistance into and out of circuit with each of said filaments.

41. In an exhausting machine, a support for a bulb, a pump, automatic means for connecting the pump with a bulb in said support, a heater mounted in position to coöperate with the tubulature of the bulb in the support, and means for adjusting the heater relatively to the tubulature.

42. A sealing-off machine having means for supporting a bulb and its tubulature, a heater for softening the glass at the connection between the bulb and tubulature, and means for automatically moving the bulb and tubulature relatively to seal off when the glass is softened.

43. A machine for making incandescent lamps having a rotatable frame, a plurality of supports for bulbs carried thereby, a pump, means for connecting the pump to a bulb on said frame, a heater mounted to play upon the tubulature of another bulb on said frame, sealing off devices in coöperative relation to a third bulb on said frame, and means for rotating the frame intermittently to carry the several bulbs on the frame in coöperative relation to the pump, the heater and the sealing-off devices successively.

44. In apparatus for exhausting lamp bulbs, a movable carrier having a series of supports for supporting the lamp bulbs, means for exhausting the bulbs, and devices for bringing the bulbs successively in communication with the exhausting devices, and controlled by the movement of the carrier, substantially as specified.

45. In apparatus for exhausting lamp bulbs, a movable carrier having a series of supports for supporting the lamp bulbs, devices actuated by the movement of the carrier for bringing the filament by successive stages to incandescence, and devices for exhausting the bulbs, substantially as specified.

46. In apparatus for exhausting lamp bulbs, the combination of a movable carrier, a series of sockets connected with an air-exhaustion device and adapted to receive the tubulatures of lamp bulbs, an electric circuit including a variable resistance device adapted to be connected with the leading in wires of the bulbs, and a device for connecting said circuit through different resistances during a pre-determined interval controlled by the movement of the carrier, substantially as specified.

47. In apparatus for exhausting lamp bulbs, the combination of a movable carrier, a series of sockets connected with an air exhausting device and adapted to receive the tubulatures of lamp bulbs, an electric circuit adapted to be connected with the leading in wires of the lamp bulbs, a device for making contact with the circuit of the movable carrier, and resistance arranged to vary the current supplied to the lamp bulb leading in wires, and controlled by the movement of the carrier, substantially as specified.

48. In apparatus for exhausting lamp bulbs, a movable carrier having a series of sockets adapted to receive the tubulatures of lamp bulbs, means for bringing said sockets successively into communication with an air pump, an electric circuit connected with the leading in wires of the bulbs and an interrupting device for supplying current from the terminals on the fixed stand of the apparatus to the circuit on the movable carrier, substantially as specified.

49. Mechanism for evacuating lamp bulbs comprising an exhaust connection, automatic means for establishing communication between a bulb and the exhaust connection, automatic means for breaking such communication, automatic means adapted to conduct a current through the filament of the lamp during maintenance of said connection and after the breaking thereof, and automatic means for applying heat locally to a projection of the bulb after the connection is broken.

50. Mechanism for evacuating lamp bulbs comprising an exhaust head adapted to receive the bulb, a plurality of exhaust connections, means adapted to shift the exhaust head so as to successively communicate with the several exhaust connections, means for conducting a current through the filament of the lamp during the shifting of the exhaust head, means for automatically varying the current at certain points in the path of movement, and means for applying heat locally to a projection from the bulb.

In testimony whereof, I hereunto affix my signature in the presence of two witnesses.

JOHN R. MASSEY.

Witnesses:
F. P. HARRIS,
J. M. STRONG.